United States Patent
Wybenga et al.

(10) Patent No.: US 7,782,874 B2
(45) Date of Patent: Aug. 24, 2010

(54) APPARATUS AND METHOD FOR ROUTE SUMMARIZATION AND DISTRIBUTION IN A MASSIVELY PARALLEL ROUTER

(75) Inventors: Jack C. Wybenga, Plano, TX (US); Patricia Kay Sturm, McKinney, TX (US); Jorge Fossati, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 12/070,549

(22) Filed: Feb. 19, 2008

(65) Prior Publication Data

US 2008/0212592 A1 Sep. 4, 2008

Related U.S. Application Data

(63) Continuation of application No. 10/832,010, filed on Apr. 26, 2004, now Pat. No. 7,369,561.

(60) Provisional application No. 60/488,197, filed on Jul. 17, 2003.

(51) Int. Cl.
- *H04L 12/28* (2006.01)
- *H04L 12/56* (2006.01)
- *H04L 1/00* (2006.01)
- *H04L 12/26* (2006.01)
- *G06F 15/173* (2006.01)

(52) U.S. Cl. ................ 370/396; 370/238; 709/242
(58) Field of Classification Search ............. 370/238, 370/396; 709/242
See application file for complete search history.

(56) References Cited

U.S. PATENT DOCUMENTS

| 6,850,984 | B1 | 2/2005 | Kalkunte et al. | |
|---|---|---|---|---|
| 7,369,561 | B2 * | 5/2008 | Wybenga et al. | 370/396 |
| 2003/0137974 | A1 | 7/2003 | Kwan et al. | |
| 2004/0093521 | A1 | 5/2004 | Hamadeh et al. | |

* cited by examiner

*Primary Examiner*—Ronald Abelson

(57) ABSTRACT

A router for interconnecting external devices coupled to the router. The router comprises a switch fabric and a plurality of routing nodes coupled to the switch fabric. Each routing node is capable of transmitting data packets to, and receiving data packets from, the external devices and is further capable of transmitting data packets to, and receiving data packets from, other routing nodes via the switch fabric. The router also comprises a control processor for comparing the N most significant bits of a first subnet address associated with a first external port of a first routing node with the N most significant bits of a second subnet address associated with a second external port of the first routing node. The router determines a P-bit prefix of similar leading bits in the first and second subnet addresses and transmits the P-bit prefix to other routing nodes.

20 Claims, 8 Drawing Sheets

APPARATUS AND METHOD FOR ROUTE SUMMARIZATION AND DISTRIBUTION IN A MASSIVELY PARALLEL ROUTER

CROSS-REFERENCE TO RELATED APPLICATIONS AND CLAIM OF PRIORITY

The present invention is a continuation of prior U.S. patent application Ser. No. 10/832,010, filed on Apr. 26, 2004 now U.S. Pat. No. 7,369,561, entitled "Apparatus and Method for Route Summarization and Distribution in a Massively Parallel Router." U.S. patent application Ser. No. 10/832,010is assigned to the assignee of the present application. The subject matter disclosed in U.S. patent application Ser. No. 10/832,010 is hereby incorporated by reference into the present disclosure as if fully set forth herein. The present invention hereby claims priority under 35 U.S.C. § 120 to U.S. patent application Ser. No. 10/832,010. The present invention is also related to that disclosed in U.S Provisional Patent Application Ser. No. 60/488,197, filed on Jul. 17, 2003, entitled "Route Summarization and Distribution in a Massively Parallel Router." Provisional Patent Application Ser. No. 60/488,197 is assigned to the assignee of the present application. The subject matter disclosed in Provisional Patent Application Serial No. 60/488,197 is hereby incorporated by reference into the present disclosure as if fully set forth herein. The present invention hereby claims priority under 35 U.S.C. §119(e) to U.S. Provisional Patent Application Ser. No. 60/488,197.

TECHNICAL FIELD OF THE INVENTION

The present invention is generally directed to distributed architecture routers and, in particular, to a massively parallel router that distributes summarized route prefix information to multiple routing nodes.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

Traditionally, a single processor is used to forward all packets in a router or switch. Even in routers with multiple forwarding table lookup threads, these threads are under control of a single processor and use a single forwarding table. Thus, conventional routers retain route information in a central location and do not distribute route information within the router. Also, since many prior art routers do not have multiple routing nodes, these routers do not experience the problems that arise when a distributed architecture combines routing nodes with small table space with more powerful routing nodes in a large route capacity router.

The main disadvantage of prior art routers is the inability to handle line rate forwarding for high bandwidth links, such as 10 Gbps interfaces. This is especially true for the longest prefix matches encountered when forwarding IPv6 packets. Also, when the table space limitations of current routers are exceeded, the routers drop routes from their routing tables or cease to learn new routes. Thus, conventional routers drop packets that would be routable if adequate table space were available. Conventional routers may use a default route instead of dropping a packet. But there is only one default route for the whole router, so the chances of successfully routing the packet are small. If no default route is defined, conventional routers drop the packets.

Therefore, there is a need in the art for improved high-speed routers. In particular, there is a need for a high-speed router that is not limited in performance by the size requirements of large routing tables in each of a plurality of routing nodes. More particularly, there is a need for a high-speed router that optimizes routing (forwarding) table space by storing routing information in an efficient manner.

SUMMARY OF THE INVENTION

The present invention overcomes the shortcomings of the prior art routers by introducing methods of route summarization and distribution. The present invention limits the bandwidth needed for internal route distribution within a router and reduces forwarding table space requirements. The present invention also allows routing nodes with limited table space to be used within a router and avoids dropping packets that may be known to the external network.

The present invention summarizes routes for internal distribution by aggregating routes whose prefixes have matching most significant bits into a single route with a shorter prefix composed of the matching most significant bits. This type of summarization enables routing nodes with small table space to participate in a router. Aggressive route summarization is done on external routes on the theory that another router in the network may have more visibility and may be able to handle the packet. Thus, a router according to the principles of the present invention implements an "always route" strategy. This means the router is designed to have a tendency to guess about how to forward a packet, instead of dropping the packet. The present invention assumes that if an external router knows how to handle a similar subnet, it may have knowledge about how to handle a packet with a similar prefix. Thus, packets with unknown prefixes that are similar to the subnets of known routes are routed like the similar route.

Accordingly, to address the above-discussed deficiencies of the prior art, it is a primary object of the present invention to provide a router for interconnecting external devices coupled to the router. According to an advantageous embodiment of the present invention, the router comprises: 1) a switch fabric; 2) a plurality of routing nodes coupled to the switch fabric, wherein each of the plurality of routing nodes is capable of transmitting data packets to, and receiving data packets from, the external devices and is further capable of transmitting data packets to, and receiving data packets from, other ones of the plurality of routing nodes via the switch fabric; and 3) a control processor capable of comparing the N most significant bits of a first subnet address associated with a first external port of a first routing node with the N most significant bits of a second subnet address associated with a second external port of the first routing node and, in response to the comparison, determining a P-bit prefix of similar leading bits in the first and second subnet addresses, wherein the control processor distributes the P-bit prefix to other ones of the plurality of routing nodes.

According to one embodiment of the present invention, each of the other ones of the plurality of routing nodes stores the P-bit prefix in a forwarding table associated with the each of the other ones of the plurality of routing nodes.

According to another embodiment of the present invention, a second one of the plurality of routing nodes forwards a data packet having an address beginning with the P-bit prefix to the first routing node.

According to still another embodiment of the present invention, the control processor is associated with the switch fabric.

According to yet another embodiment of the present invention, the control processor is associated with a select one of the plurality of routing nodes.

According to a further embodiment of the present invention, the control processor is further capable of comparing the N most significant bits of a first subnet address associated with a first external port of a second routing node with the N most significant bits of a second subnet address associated with a second external port of the second routing node and, in response to the comparison, determining an R-bit prefix of similar leading bits in the first and second subnet addresses of the second routing node, wherein the control processor distributes the R-bit prefix to other ones of the plurality of routing nodes.

According to a still further embodiment of the present invention, the control processor further compares the P-bit prefix and the R-bit prefix.

According to yet further embodiment of the present invention, the control processor ensures that the P-bit prefix and the R-bit prefix differ by at least one least significant bit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
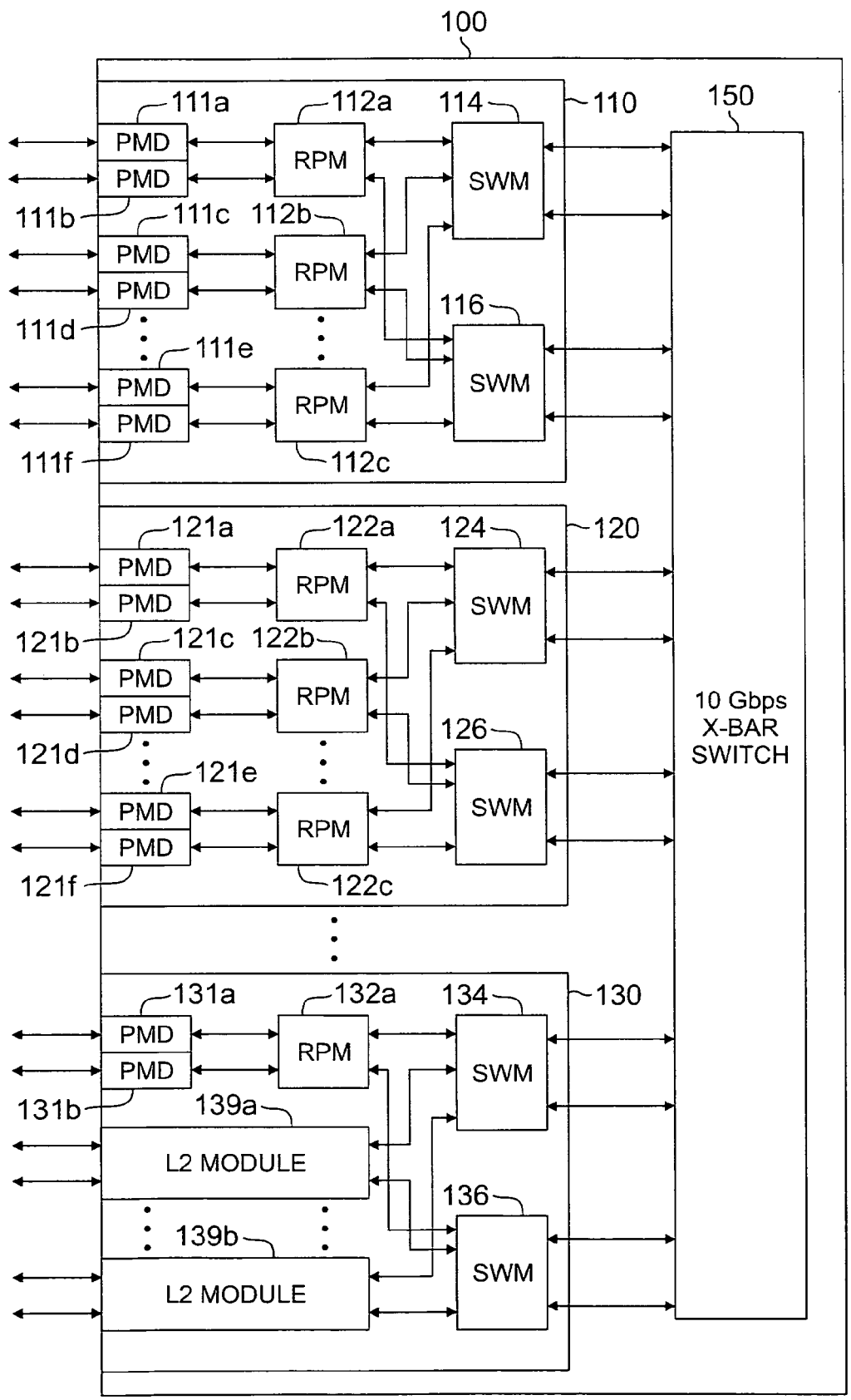
FIG. 1 illustrates an exemplary distributed architecture router, which distributes forwarding table lookup operations across a plurality of microengines and threads according to the principles of the present invention.

FIG. 1 illustrates exemplary distributed architecture router 100, which summarizes and distributes route information across plurality of routing nodes according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMS) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M its coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
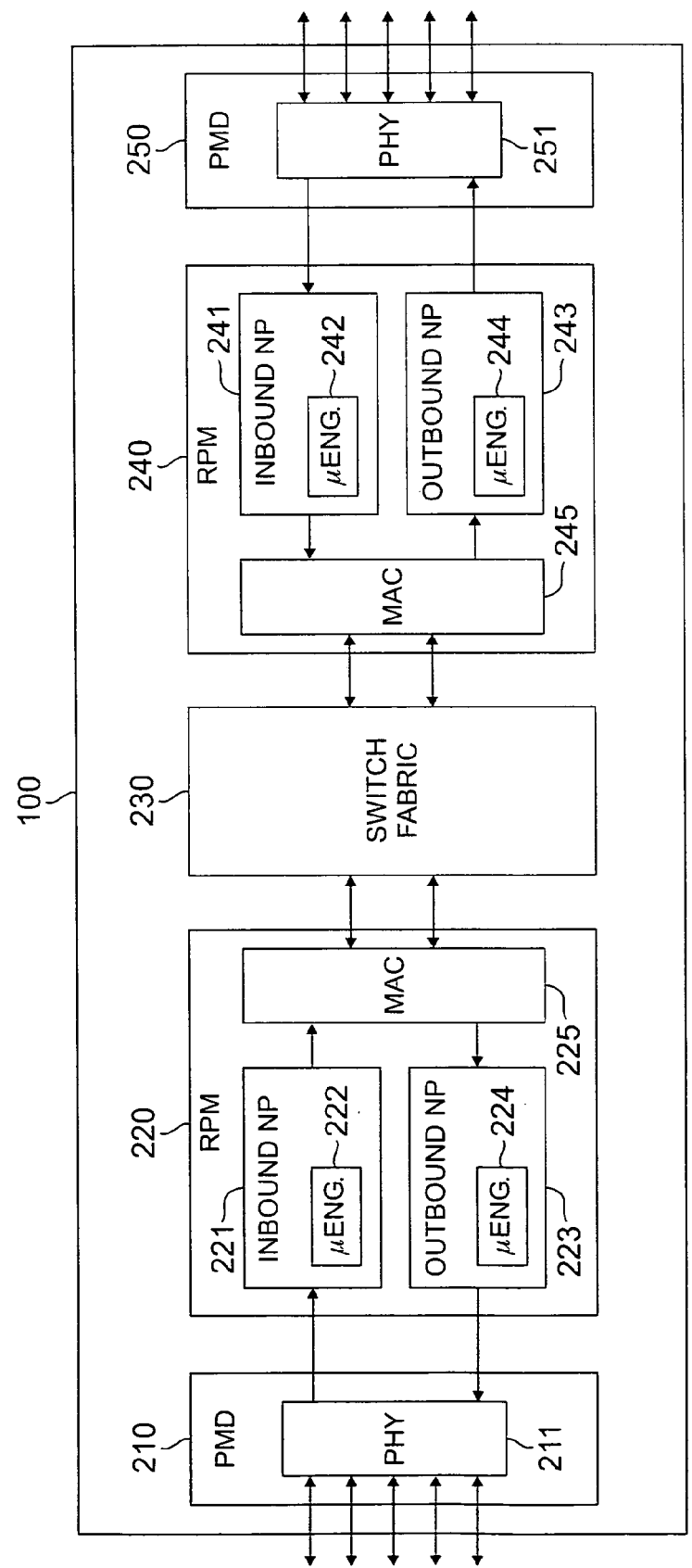
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (µEng.) 222 and outbound NP 223 comprises N microengines (µEng.) 224. Similarly, inbound NP 241 comprises N microengines (µEng.) 242 and outbound NP 243 comprises N microengines (µEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating-on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
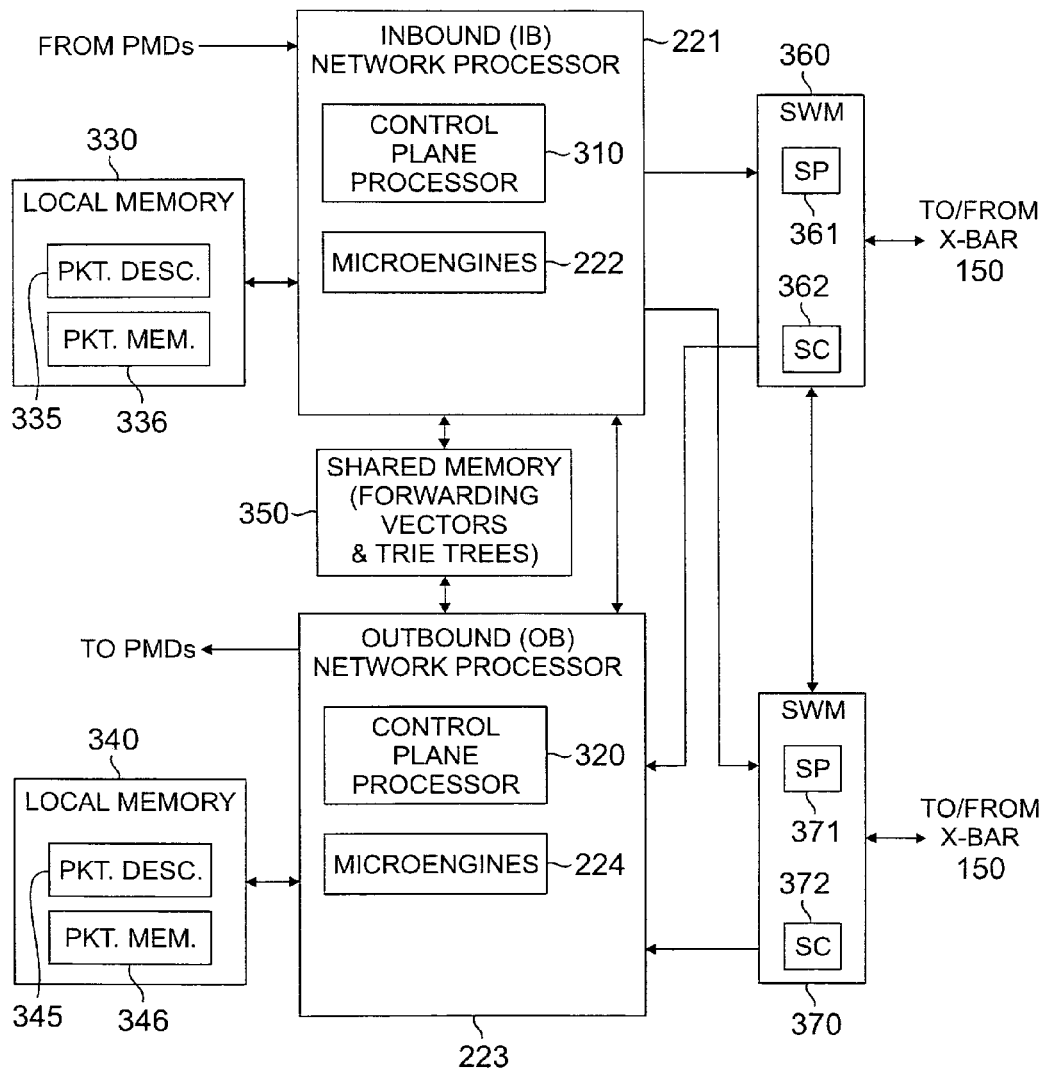
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through Gigabit optical links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." U.S. patent application Ser. No. 10/794,506 was incorporated by reference above. The routing table search circuit comprises an initial content addressable memory (CAM) stage followed by multiple trie tree search table stages. The CAM stage allows searches to be performed on data packet header information other than regular address bits, such as, for-example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the illustrated embodiment, router 100 distributes the routing and forwarding functions among many routing nodes. To reduce the control plane communications bandwidth required for the internal distribution of routes, router 100 aggregates routes using a route summarization mechanism according to the principles of the present invention. Router 100 also supports summarization of external routes to allow internal routing nodes with limited table space to be used within router 100 and to reduce the forwarding table size requirements and forwarding lookup depth. Some of the routing nodes (i.e., the L2 nodes) have small size Layer 3 forwarding tables, so aggressive route summarization supports the large route capacity (nominally, one million routes) provided by router 100.

As noted above, router 100 implements an "always route" approach, in which data packets are sent to an external router that is expected to have more information about how to route the data packet. Use of aggressive route summarization, together with the "always route" approach, allows a reduction in forwarding table size. This reduces the amount of expensive, high-speed memory needed and avoids (or diminishes) the board layout limitations and complexity associated with high-speed memory devices.

Router 100 shares routing information in the form of aggregated routes among all of the RPM and L2M routing engines. Each routing node sends its route information to the Master SWM, which distributes it to all of the routing nodes. To reduce the control plane bandwidth needed to distribute the routing information within router 100 and to reduce the forwarding table size required in each routing node, aggregated routes are used. To meet the limited Layer 3 forwarding capability of the L2Ms aggressive route summarization is needed.

According to an exemplary embodiment of the present invention, the control plane processors in router 100 (e.g., switch processor (SP) 361 in SWM 360, SP 371 in SWM 370, CPP 310 in IB NP 221, CPP 320 in OB NP 223, system processors of the L2 modules) perform the route summarization functions. Typically, the routing protocols run in CPP 310 of ID NP 221, although each protocol may be allocated to either of ID NP 221 or OD NP 223.

The RPM and L2 module control plane processors build the forwarding tables used by the data plane processors. In the case of the RPMs, one of the network processors—typically the inbound network processor—builds the forwarding tables with support from the other network processor. Microengines 222 in IB NP 221 and microengines 224 in OB NP 223 use the forwarding tables to forward packets. The L2 modules learn Layer 2 routes from the traffic and from a Rapid Spanning Tree Protocol (RSTP). The switch processor builds Layer 3 routes and hardware performs the packet forwarding.

Route summarization according to the principles of the present invention amounts to shortening the prefix used in forwarding the packet. In other words, router 100 drops some of the least significant subnet bits. This process also is called route aggregation, since many routes are combined into a single route. The control software executed by the control plane processor (e.g., CPP 310) of each RPM and L2 module sends the learned Layer 3 routes to a Master switch module (SWM). One of the switch modules (e.g., SWM 360, or SWM 370) may be designated as the master switch module. The control plane processors in the RPMs and in the L2Ms perform route summarization on routes they learned through their routing protocols, through provisioning, and through internal route distribution via the Master SWM. All routes to the same RPM may be summarized in other RPMs and L2Ms since it only is necessary to deliver packets to the RPM associated with the destination port. The destination RPM can deliver them to the correct port. Also, routes to the same local output port may be summarized. The Master SWM does internal route summarization and sends the aggregated (or summarized) routes to all the RPMs and L2 modules. These summarized routes can be distributed via broadcast or unicast messaging by the Master SMW. The RPMs and L2 modules then build the forwarding table entries for these summarized routes.

To better illustrate route summarization according to the principles of the present invention, an example is now described for IPv4 data packet forwarding. However, it should be understood that similar techniques apply to other packet types, such as IPv6 and MPLS.

Figure 4A:
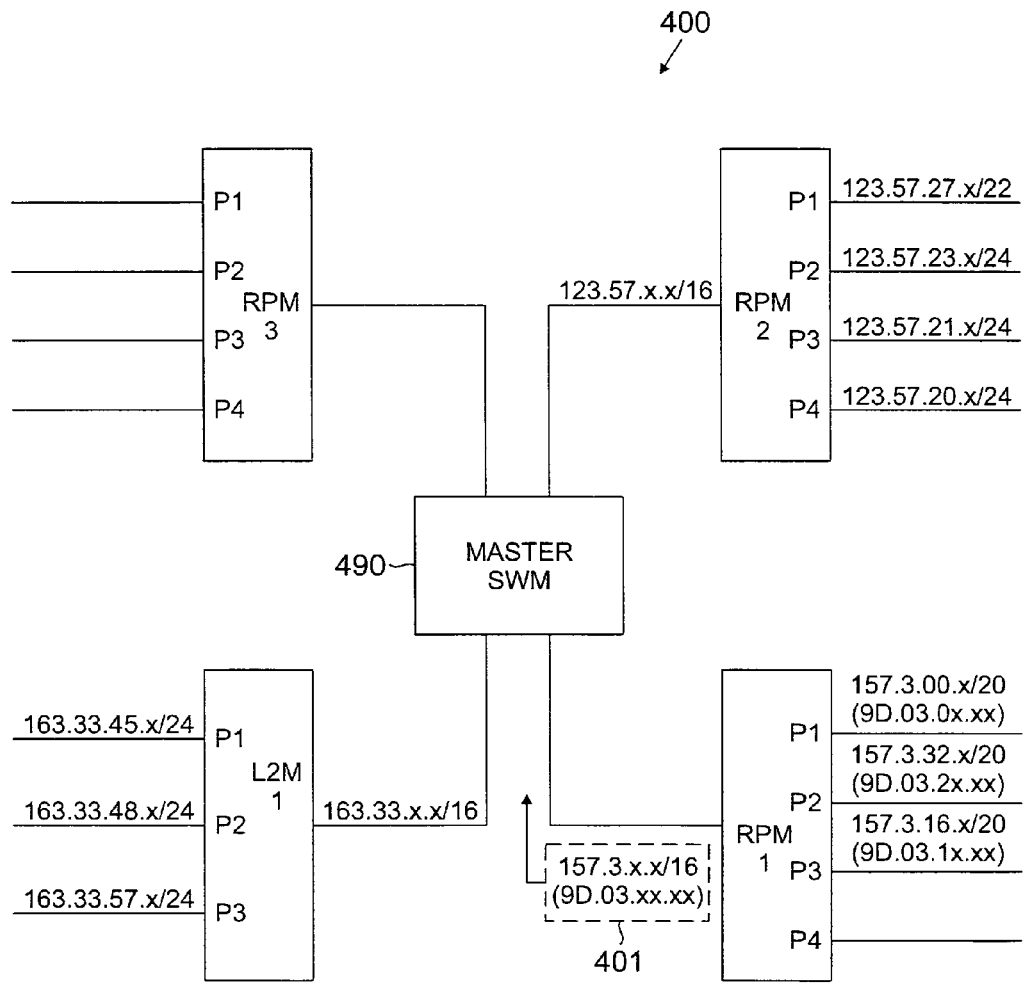
FIGS. 4A-4D illustrate internal route summarization according to the principles of the present invention.

FIGS. 4A-4D illustrate internal route summarization according to the principles of the present invention. In FIG. 4A, three route processing modules, labeled RPM 1, RPM 2 and RPM 3, and a Layer 2 module, labeled L2M 1, are shown coupled to master switch module (SWM) 490. Master SWM 490 may be any one of switch modules 114, 116, 124, 126, 134, 136 in the routing nodes of router 100. The external interfaces show the subnets supported on each port (P1, P2, P3, etc.) and the internal interfaces to master SWM 490 show the mapping of subnets to each RPM and L2M. In FIGS. 4A-4D, master SWM 490 is the device that determines and distributes the internal subnet masks for each RPM and L2M.

In FIG. 4A, RPM 1, RPM 2, RPM 3 and L2M 1 are in initial state 400. In initial state 400, RPM 1 already has three routes, one each on ports P1, P2 and P3. The routes are represented as a subnet mask in decimal format and in hexadecimal format (in parentheses). Port P1 of RPM 1 is associated with a route having the external 20-bit subnet mask 157.3.00.x/20 (9D.03.0x.xx). Port P2 of RPM 1 is associated with a route having the external 20-bit subnet mask 157.3.32.x/20 (9D.03.2x.xx). Port P3 of RPM 1 is associated with a route having the external 20-bit subnet mask 157.3.16.x/20 (9D.03.1x.xx). Port P4 of RPM 1 is not yet associated with a route.

In initial state 400, RPM 3 has no routes. On RPM 2, Ports P1, P2, P3 and P4 are associated with routes having the external 22-bit and 24-bit subnet masks 123.57.27.x/22, 123.57.23.x/24, 123.57.21.x/24, and 123.57.20.x/24, respectively. On L2M 1, Ports P1, P2 and P3 are associated with routes having the external 24-bit subnet masks 163.33.45.x/24, 163.33.48.x/24 and 163.33.57.x/24, respectively.

In initial state 400, the external subnet masks for RPM 1 are 20 bits in length, but the internal subnet mask 401 determined by the control plane processor of RPM 1 or by the master SWM 490 is 16 bits in length. If these routes were learned directly by RPM 1 through provisioning or via routing protocols operating in RPM 1, then RPM 1 can summarize them before sending them to the Master SWM. If these routes were learned by different RPMs, then the individual RPMs send the component routes to the Master SWM, which performs the summarization. The initial internal subnet mask 401 for RPM 1 is 157.3.x.x/16 (9D.03.xx.xx). Similarly, the initial internal subnet mask for RPM 2 is 123.57.x.x/16 and the initial internal subnet mask for L2M 1 is 163.33.x.x/16. In the remainder of this example, new routes will be added only to RPM 1 and RPM 3 and the internal subnet masks for RPM 2 and L2M 1 will remain unchanged.

In initial state 400, RPM 3, RPM 2 and L2M 1 send any packets having a prefix starting with 157.3 to RPM 1. Thus, the forwarding tables of RPM 3, RPM 2 and L2M 1 have only a single entry with a mask of length 16 for RPM 1. This allows RPM 3, RPM 2 and L2M 1 to deliver packets correctly to RPM 1. RPM 1 has three entries in its forwarding table, each with a mask of 20 bits. This permits RPM 1 to deliver packets to the correct interface. Thus, there is a saving of 3 routes in all of the forwarding tables, except for the RPM 1 table. Control plane bandwidth is conserved, since only one route for RPM 1 must be distributed. Similar savings occur for the RPM 2 and L2M 1 routes. In addition to saving forwarding table space, this summarization reduces the workload on the data plane processors by reducing the number of stages in the tree search by one, since there is one less nibble in the prefix.

Figure 4B:
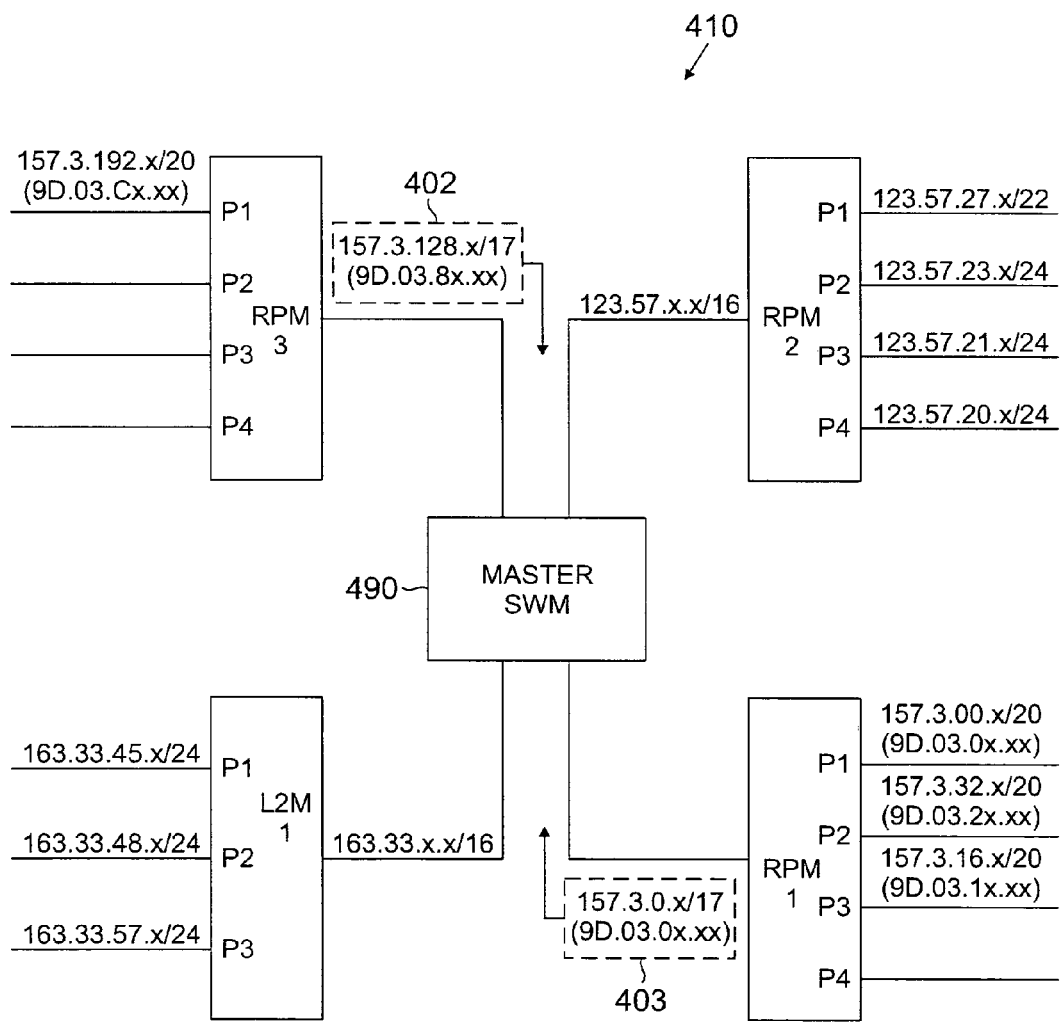

In FIG. 4B, RPM 1, RPM 2, RPM 3 and L2M 1 have entered a second state, namely state 410. In state 410, RPM 3 has learned a first route (on Port P1). Port P1 of RPM 3 is associated with a route having the external 20-bit subnet mask 157.3.192.x/20 (9D.03.Cx.xx). At this point, RPM 1 and RPM 3 both have routes beginning with the 16-bit prefix-157.3 (9D.03), so it is necessary to further differentiate these routes internally. If the master SWM summarized these routes, it will recompute the summarized routes and distribute them. If RPM 1 summarized these routes, it will recognize a conflict by the new route distributed by the master SWM and either recompute the summarized routes or send its component routes to master SWM 490 for summarization. In this example it is assumed that master SWM is performing the summarization.

The internal subnet mask 402 for RPM 3 is 157.3.128.x/17 (9D.03.8x.xx). Master SWM 490 modifies the internal subnet mask 401 of RPM 1 by adding one more bit to give the new internal 17-bit subnet mask 403. The new internal subnet mask 403 for RPM 1 is 157.3.0.x/17 (9D.03.0x.xx). The third byte of mask 403 is 0xxx xxxx for RPM 1 and the third byte of mask 402 is 1xxx xxxx for RPM 3. Now each RPM and L2M can deliver packets with a 157.3.x.x prefix to the correct RPM. There still is a savings in the number of internal routes because the three routes known to RPM 1 are reduced to 1 route for the other RPMs and L2Ms. As before, the other RPMs and L2Ms only need to get the data packets to the correct RPM and the RPM gets the data packet to the correct port.

Figure 4C:
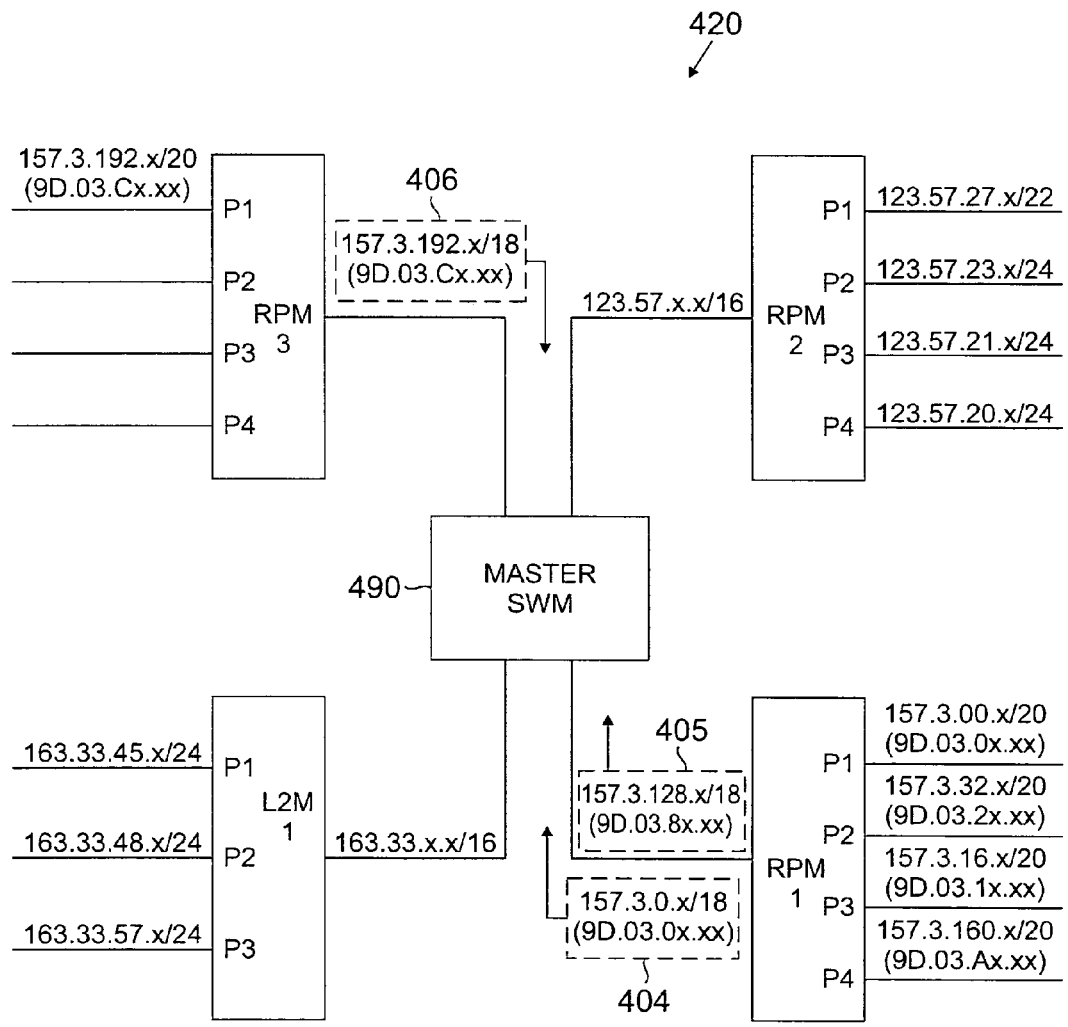

In FIG. 4C, RPM 1, RPM 2, RPM 3 and L2M 1 are in a third state, namely state 420. In state 420, RPM 1 has learned a fourth route (on Port P4). Port P4 of RPM 1 is associated with a route having the external 20-bit subnet mask 157.3.160.x/20 (9D.03.Ax.xx). This route conflicts with the RPM 3 prefix, so master SWM 490 makes additional changes to the internal routes to resolve this conflict. The conflict may be resolved by noting that the first two bits of the third byte are 11 for RPM 3 and are either 00 or 10 for RPM 1. Thus, master SWM 490 changes the prefixes to 18 bit prefixes.

In this case, RPM 3 still only needs one route, but RPM 1 needs two routes, to cover the two cases for the first two bits of the third byte. Thus, master SWM 490 replaces the internal subnet mask 403 of RPM 1 with two new internal 18-bit subnet masks 404 and 405. The new internal subnet mask 404 for RPM 1 is 157.3.0.x/18 (9D.03.0x.xx). The new internal subnet mask 405 for RPM 1 is 157.3.128.x/18 (9D.03.8x.xx). Master SWM 490 also replaces the internal subnet mask 402 of RPM 3 with new internal 18-bit subnet mask 406. The new internal subnet mask 406 for RPM 3 is 157.3.192.x/18 (9D.03.Cx.xx).

There still is a savings, in that each RPM and L2M in the system only needs two routes for RPM 1, instead of four, thus conserving forwarding table space in each of the other RPMs and L2Ms. In addition, only two routes must be distributed for RPM 1, instead of four, thus conserving control plane bandwidth.

Figure 4D:
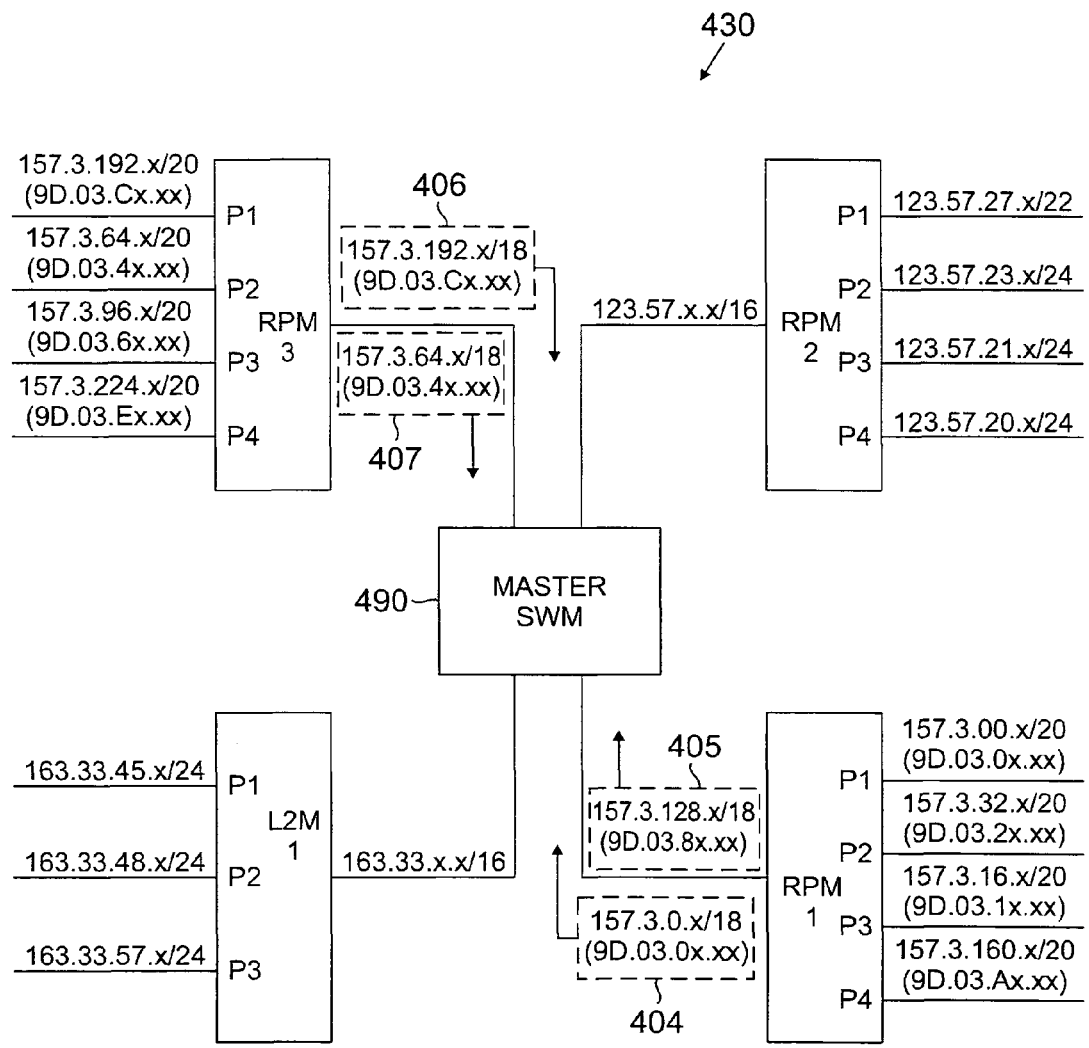

In FIG. 4D, RPM 1, RPM 2, RPM 3 and L2M 1 are in a fourth state, namely state 430. In state 430, RPM 3 has learned three new routes (on Ports P2, P3 and P4). Now, for some of the routes on RPM 3, the first two bits of the third byte are 01. Thus, a new internal subnet mask is needed for RPM 3. Master SWM 490 adds a new internal subnet mask 407 for RPM 3. The new internal subnet mask 407 for RPM 3 is 157.3.64.x/18 (9D.03.4x.xx). Now the savings is two prefixes for RPM 1 and two prefixes for RPM2.

L2M 1 has limited table space and may be subjected to more aggressive summarization. For example, L2M 1 may use a 16-bit mask, 157.3.x.x/16 (9D.03.xx.xx), for all of states 400, 410, 420 and 430. Thus, the L2M makes forwarding mistakes by forwarding RPM 3 packets to RPM-1. Since RPM 1 has more complete knowledge of the prefix, it corrects the mistake and forwards the packet on to RPM 3. Thus, the problem is corrected at the expense of one extra hop through router 100.

Advantageously, if internal route summarization reduces the number of nibbles in the prefix, then it also reduces the number of required stages in the trie tree search. This reduces the workload on the data plane processors in forwarding packets.

Figure 5:
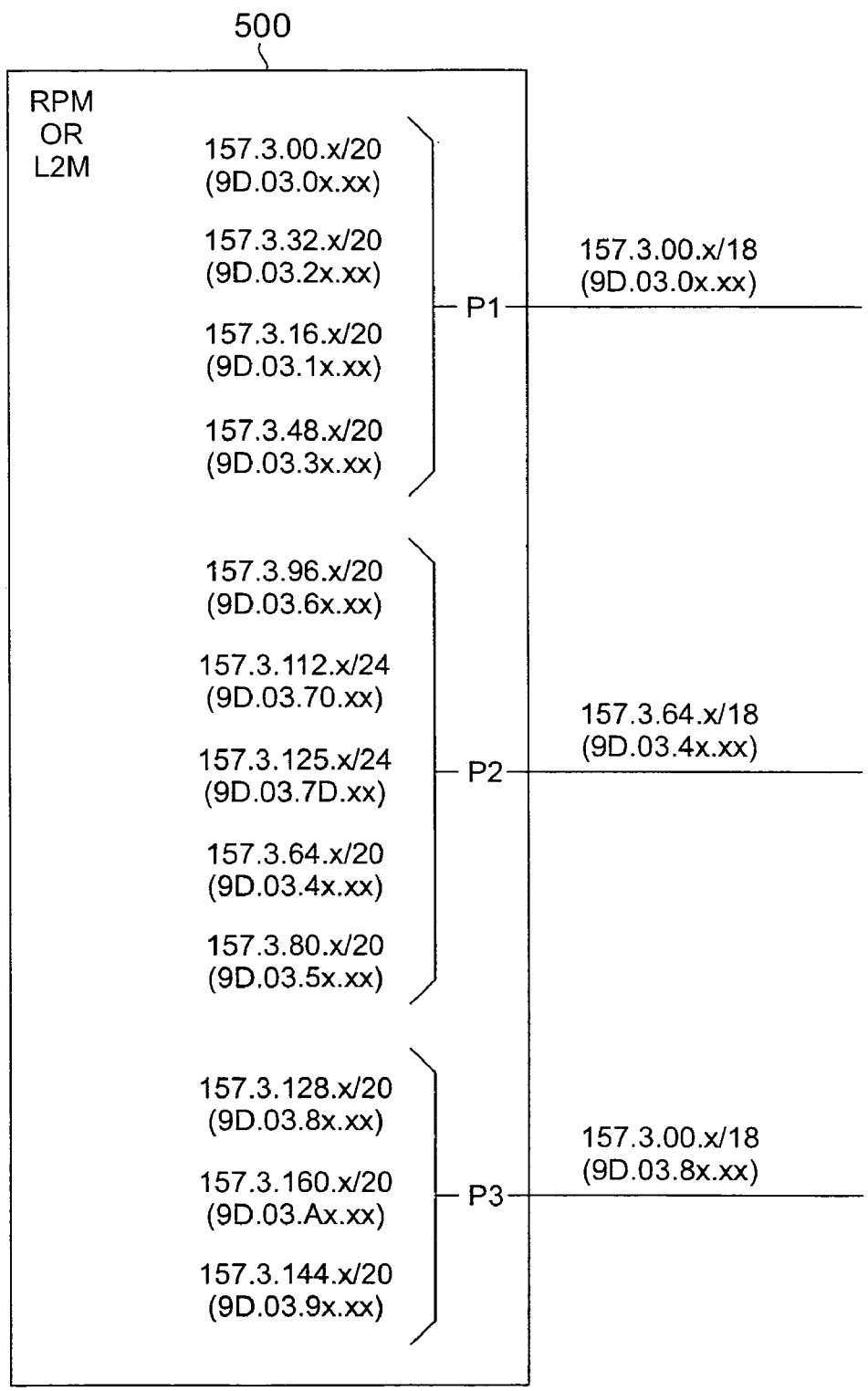
FIG. 5 illustrates external route summarization according to the principles of the present invention.

FIG. 5 illustrates external route summarization according to the principles of the present invention. In FIG. 5, module 500 may represent either a route processing module (RPM) or a Layer 2 (L2) module, as described above. External route summarization is similar to internal route summarization in that it amounts to shortening the prefix used in forwarding the data packet. However, unlike internal route summarization, external route summarization may be visible to the external networks coupled to router 100. The control plane processor (CPP) in the RPM or the L2M that builds the forwarding table performs external route summarization.

In FIG. 5, the port markings external to module 500 show the forwarding table entry associated with each port (e.g., P1, P2, P3) and the routes listed inside the RPM or L2M block show the routes learned by the RPM or L2M. The port markings represent the prefixes of all of the routes that are output to the port. The examples in this section are for IPv4 forwarding, but similar techniques apply to other packet types, such as IPv6 and MPLS.

The first type of external route summarization performed by module 500 is simple aggregation, wherein a complete set of routes of a given mask length are summarized into a single route with a shorter mask. Port 1 illustrates this type of summarization. On Port 1, four internal-routes, each with a 20-bit prefix, are summarized into a single route with an 18-bit prefix. The 20-bit internal prefixes begin with the same two bytes, namely [9D.03. . . . ]. The third bytes for the four internal routes are [0000xxxx], [0001xxxx], [0010xxxx] and [0011xxxx]. Since the first two bits of all of the third bytes are all [00], the external 18-bit prefix begins with the 3-byte sequence [9D.03.0x . . . ], where the third byte is equal to [00xxxxxx]. Since all of the possible subnets of the main 18-bit prefix are known, there is no misrouting. The same packets will be delivered to the interface regardless of whether the summarization is done and no extra packets are sent to the interface.

The Port P1 example allows a reduction of the routing table size from four entries to a single entry. If the reduction had been from 20 bits to 16 bits, instead of from 20 to 18 bits, it also would have resulted in traversing one less stage in the forwarding table tree, thus improving throughput.

The routing protocol might be expected to do this simple aggregation, making summarization by router 100 unnecessary. While this might be true if all routes are learned by the same routing protocol, it may not be true if the routes were learned through different routing protocols or if some of the routes were provisioned.

The second type of summarization is more aggressive. The second type of summarization allows some packets to be forwarded that otherwise would be dropped or sent to the default route. It is characterized by defining a port to which to send extra packets that would otherwise be dropped or sent to a default route. The extra packets belong to a subnet that is a superset of the component subnets. That is, the subnet of the extra packets has a prefix that is shorter than the prefix of the forwarding subnet, but whose prefix matches the most significant portion of only one other forwarding table entry. Ports P2 and P3 in FIG. 3 are examples of the second type of summarization. Sending these packets to a best match port is a mild form of the "always route" philosophy.

In the case of Port P2, three of the four 20-bit sub-prefixes of the 18 bit prefix are fully defined. That is, for the three routes having 20-bit prefixes beginning with [9D.03.4x.xx], [9D.03.5x.xx], and [9D.03.6x.xx], the third bytes are [0100xxxx], [0101xxxx], and [0110xxxx]. A fourth route beginning with [9D.03.7x.xx] is missing, wherein the third byte is [0111xxxx]. The fourth 18-bit prefix is only partially defined. It is divided into two 24-bit prefixes, [9D.03.70.xx] and [9D.03.7D.xx], which cover only two of the sixteen possible sub-prefixes. However, if it is assumed that routes beginning with [9D.03.7x.xx] are associated with Port P2, then the first two bits of all of the third bytes are all [01] and the external 18-bit prefix for Port P2 begins with the 3-byte sequence [9D.03.4x . . . ], where the third byte is equal to [01xxxxxx].

In the first level of summarization, the two 24-bit prefixes are treated like a single 20-bit prefix. Then, a second level of summarization is done using the first summarization technique, resulting in an 18-bit prefix. The only external effect of this summarization is that packets for the missing fourteen 24-bit prefixes having third bytes between 70 and 7F are sent out Port P2. However, these packets are sent along a path that is likely to know more about them, since the routers on this path already know about routes with similar prefixes (i.e., [9D.03.70.xx] and [9D.03.7D.xx]). This summarization reduces the number of routes in the forwarding table from five to one. It also reduces the number of stages in the tree search by one for the routes with the 24 bit prefix, since tree stages are based on nibbles and there is one less nibble.

The example shown on Port P3 is similar, except one of the subnets is entirely missing, instead of being partially missing. In this case, routes beginning with [9D.03.8x.xx], [9D.03.9x.xx], and [9D.03.Ax.xx] are defined, where the third bytes are [1000xxxx], [1001xxxx], and [1010xxxx], respectively. However, there are no routes beginning with [9D.03.Bx.xx], where the third byte is [1011xxxx].

This case is handled just like the Port P2 case. The fact that a subnet is missing is ignored. The packets for the missing subnet are assumed to be associated with Port P3 and are sent out Port P3. If it is assumed that routes beginning with [9D.03.Bx.xx] are associated with Port P3, then the first two bits of all of the third bytes are all [10] and the external 18-bit prefix for Port P2 begins with the 3-byte sequence [9D.03.8x . . . ], where the third byte is equal to [10xxxxxx]. In this case, the number of routes in the forwarding table is reduced from three to one.

The third type of summarization is an even more aggressive form of summarization. In this case, packets with unknown routes are sent out a best match port that has no known component routes. The port is selected from prefixes that match to a smaller depth. This method of summarization is similar to a default route, but does use some prefix information to determine the port. This is a more aggressive form of the "Always Route" philosophy.

By way of example, the third type of summarization may be illustrated by a default route associated with Port P1 that begins with the 16-bit prefix [9D.03.xx.xx]. Port P1 is already associated with the external 18-bit prefix [9D.03.0x.xx], wherein the third byte is [00xxxxxx]. Port P2 is already associated with the external 18-bit prefix [9D.03.4x.xx], wherein the third byte is [01xxxxxx]. Port P3 is already associated with the external 18-bit prefix [9D.03.8x.xx], wherein the third byte is [10xxxxxx]. The only external prefix missing is the 18-bit prefix [9D.03.Cx.xx], wherein the third byte is [11xxxxxx].

Three of the four 18-bit prefixes are assigned to ports, but there is no routing information available on the fourth prefix. All three of the 18-bit prefixes match the fourth 18-bit prefix to an equal depth (16 bits). Thus, the port for this subnet is chosen arbitrarily, namely Port P1. Typically, it is chosen to be the first route in the previous trie tree stage of the forwarding search tables. In this case, packets with unknown routes are sent out a best match port that is not unique. The port is selected arbitrarily among prefixes that match to an equal depth. Since a longest prefix match is used, only the packets not matching any of the longer 18-bit prefix routes will use this 16-bit default route.

There is one other form of an "Always Route" technique that is used in many conventional routers: a default route. This is a path to an external router to which the current router sends all packets that it does not know how to handle. Packets that do not match any known routes are sent to this default route if one is defined and are dropped if a default route is not defined. Router 100 supports this type of default route. However, router 100 uses the summarization techniques described above to choose more likely routes than the traditional default route.

Internal route summarization allows router 100 to conserve forwarding table space, as well as control plane bandwidth. Also, it tends to lead to smaller prefixes being used, thus reducing the number of stages in the RPM trie tree search in many cases and thereby reducing the data plane workload. External route summarization and the "Always Route" philosophy allow router 100 to save forwarding table space and conserve control plane bandwidth. In addition, these techniques reduce the depth of the trie tree search, thus reducing the data plane workload. In addition, the "Always Route" philosophy allows packets to be routed based on a portion of their prefix, instead of being dropped or sent to the default route as in traditional routers. This improves the number of packets successfully routed through the network.

Although the present invention has been described with an exemplary embodiment, various changes and modifications may be suggested to one skilled in the art. It is intended that the present invention encompass such changes and modifications as fall within the scope of the appended claims.

What is claimed is:

1. A routing node for use in a router, comprising:
a routing table capable of storing a plurality of routing entries;
a plurality of external ports, a first one of the external ports associated with a first set of subnet addresses; and
a control processor configured (i) to compare the N most significant bits of each subnet address in the first set of subnet addresses, (ii) in response to the comparison, to determine a P-bit prefix that is equivalent to at least one of the leading bits in the first set of subnet addresses, and (iii) to store the P-bit prefix in the routing table.

2. The routing node as set forth in claim 1, further comprising a plurality of microengines configured to forward outbound data packets to the external ports based on the routing entries stored in the routing table.

3. The routing node as set forth in claim 2, the microengines configured to forward outbound data packets having an address beginning with the P-bit prefix to the first external port.

4. The routing node as set forth in claim 3, at least a portion of the outbound data packets having an address beginning with the P-bit prefix having a subnet address different from the subnet addresses in the first set of subnet addresses.

5. The routing node as set forth in claim 1,
a second one of the external ports associated with a second set of subnet addresses; and
wherein the control processor is further configured (i) to compare the N most significant bits of each subnet address in the second set of subnet addresses, (ii) in response to the comparison, to determine an R-bit prefix of equivalent leading bits in the second set of subnet addresses, and (iii) to store the R-bit prefix in the routing table.

6. The routing node as set forth in claim 5, further comprising a plurality of microengines configured to forward outbound data packets to the external ports based on the routing entries stored in the routing table, the microengines further configured to forward outbound data packets having an address beginning with the P-bit prefix to the first external port and to forward outbound data packets having an address beginning with the R-bit prefix to the second external port.

7. The routing node as set forth in claim 1, the control processor further configured to store a single routing entry in the routing table for each of the external ports.

8. A communication network comprising a plurality of routers that communicate data packets to one another and to interfacing external devices, each of the plurality of routers comprising a plurality of routing nodes, a first routing node of one of the routers comprising:
a routing table capable of storing a plurality of routing entries;
a plurality of external ports, a first one of the external ports associated with a first set of subnet addresses; and
a control processor configured (i) to compare the N most significant bits of each subnet address in the first set of subnet addresses, (ii) in response to the comparison, to determine a P-bit prefix that is equivalent to at least one of the leading bits in the first set of subnet addresses, and (iii) to store the P-bit prefix in the routing table.

9. The communication network as set forth in claim 8, the first routing node further comprising a plurality of microengines configured to forward outbound data packets to the external ports based on the routing entries stored in the routing table.

10. The communication network as set forth in claim 9, the microengines configured to forward outbound data packets having an address beginning with the P-bit prefix to the first external port.

11. The communication network as set forth in claim 10, at least a portion of the outbound data packets having an address beginning with the P-bit prefix having a subnet address different from the subnet addresses in the first set of subnet addresses.

12. The communication network as set forth in claim 8,
a second one of the external ports associated with a second set of subnet addresses; and
wherein the control processor is further configured (i) to compare the N most significant bits of each subnet address in the second set of subnet addresses, (ii) in response to the comparison, to determine an R-bit prefix of equivalent leading bits in the second set of subnet addresses, and (iii) to store the R-bit prefix in the routing table.

13. The communication network as set forth in claim 12, the first routing node further comprising a plurality of microengines configured to forward outbound data packets to the external ports based on the routing entries stored in the routing table, the microengines further configured to forward outbound data packets having an address beginning with the P-bit prefix to the first external port and to forward outbound data packets having an address beginning with the R-bit prefix to the second external port.

14. The communication network as set forth in claim 8, the control processor further configured to store a single routing entry in the routing table for each of the external ports.

15. The method as set forth in claim 8, further comprising:
comparing the N most significant bits of each subnet address in a second set of subnet addresses associated with a second external port of the routing node;
in response to the comparison, determining an R-bit prefix of equivalent leading bits in the second set of subnet addresses; and
storing the R-bit prefix in the routing table.

16. The method as set forth in claim 15, further comprising forwarding outbound data packets having an address beginning with the P-bit prefix to the first external port and forwarding outbound data packets having an address beginning with the R-bit prefix to the second external port.

17. A method for summarizing routes for use in a routing node of a router, comprising:
comparing the N most significant bits of each subnet address in a first set of subnet addresses associated with a first external port of the routing node;
in response to the comparison, determining a P-bit prefix that is equivalent to at least three of the leading bits in the first set of subnet addresses; and
storing the P-bit prefix in a routing table.

18. The method as set forth in claim 17, further comprising forwarding outbound data packets having an address beginning with the P-bit prefix to the first external port.

19. The method as set forth in claim 18, at least a portion of the outbound data packets having an address beginning with the P-bit prefix having a subnet address different from the subnet addresses in the first set of subnet addresses.

20. The method as set forth in claim 17, further comprising storing a single routing entry in the routing table for each of the external ports.

* * * * *